(12) United States Patent
Cosby et al.

(10) Patent No.: US 12,346,570 B2
(45) Date of Patent: Jul. 1, 2025

(54) DATA REGENERATION AND STORAGE IN A RAID STORAGE SYSTEM

(71) Applicant: Lenovo Enterprise Solutions (Singapore) Pte Ltd., Singapore (SG)

(72) Inventors: David W Cosby, Raleigh, NC (US); Wilson Velez, Raleigh, NC (US); Patrick L Caporale, Cary, NC (US); Gerald C Ushery, Jr., Raleigh, NC (US)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 33 days.

(21) Appl. No.: 18/193,921

(22) Filed: Mar. 31, 2023

(65) Prior Publication Data

US 2024/0329853 A1 Oct. 3, 2024

(51) Int. Cl.
*G06F 3/06* (2006.01)

(52) U.S. Cl.
CPC .......... *G06F 3/0617* (2013.01); *G06F 3/0658* (2013.01); *G06F 3/0689* (2013.01)

(58) Field of Classification Search
CPC .... G06F 3/0617; G06F 3/0658; G06F 3/0689; G06F 3/0628; G06F 3/0653
See application file for complete search history.

(56) References Cited

U.S. PATENT DOCUMENTS

| | | | | |
|---|---|---|---|---|
| 7,490,263 B2 * | 2/2009 | King | ................. | G11B 20/1883 |
| | | | | 714/6.13 |
| 11,144,638 B1 * | 10/2021 | Golden | ................. | G06F 21/566 |
| 2003/0172239 A1 * | 9/2003 | Swank | ................. | G06F 3/0601 |
| | | | | 711/112 |
| 2003/0231529 A1 * | 12/2003 | Hetrick | ................. | G06F 11/1092 |
| | | | | 714/E11.089 |
| 2008/0263394 A1 * | 10/2008 | Tanabe | ................. | G06F 11/2092 |
| | | | | 714/E11.062 |

(Continued)

FOREIGN PATENT DOCUMENTS

| | | | | | |
|---|---|---|---|---|---|
| CN | 108153622 A | * | 6/2018 | .......... | G06F 11/1076 |
| CN | 111752478 A | * | 10/2020 | ........... | G06F 3/0604 |

(Continued)

*Primary Examiner* — Hosain T Alam
*Assistant Examiner* — Subir Kumar Chowdhury
(74) *Attorney, Agent, or Firm* — Jeffrey L. Streets

(57) ABSTRACT

A computer program product may cause a processor to perform various operations. The operations include identifying, via communication with a RAID controller that manages operation of an array of drives as a RAID storage system, one of the drives that has been compromised, a failed component of the identified drive that compromised the identified drive, and a failure domain associated with the failed component, wherein data stored within the failure domain associated with the failed component has become inaccessible. The operations further include instructing, in response to the failed component having a failure domain that satisfies a first condition, the RAID controller to perform a first recovery action that includes regenerating the inaccessible data using data from other drives within the array of drives and storing the regenerated data on available storage of the identified drive outside the failure domain associated with the failed component.

18 Claims, 7 Drawing Sheets

(56) References Cited

U.S. PATENT DOCUMENTS

| | | | | |
|---|---|---|---|---|
| 2009/0172468 A1* | 7/2009 | Abali | ............ | G06F 11/2094 |
| | | | | 714/6.32 |
| 2013/0275815 A1* | 10/2013 | De Keyser | ........ | H03M 13/6502 |
| | | | | 714/47.2 |
| 2014/0208155 A1* | 7/2014 | Pan | ............... | G06F 11/2053 |
| | | | | 714/6.21 |
| 2021/0055872 A1* | 2/2021 | Epping | ............ | G06F 3/0631 |
| 2021/0216418 A1* | 7/2021 | Han | ............... | G06F 3/0644 |
| 2021/0326052 A1* | 10/2021 | Singh | .............. | G06F 3/0617 |

FOREIGN PATENT DOCUMENTS

| | | | | |
|---|---|---|---|---|
| DE | 112012002615 B4 * | 6/2021 | ......... | G06F 12/0862 |
| WO | WO-2004025628 A2 * | 3/2004 | ........... | G06F 1/3203 |

* cited by examiner

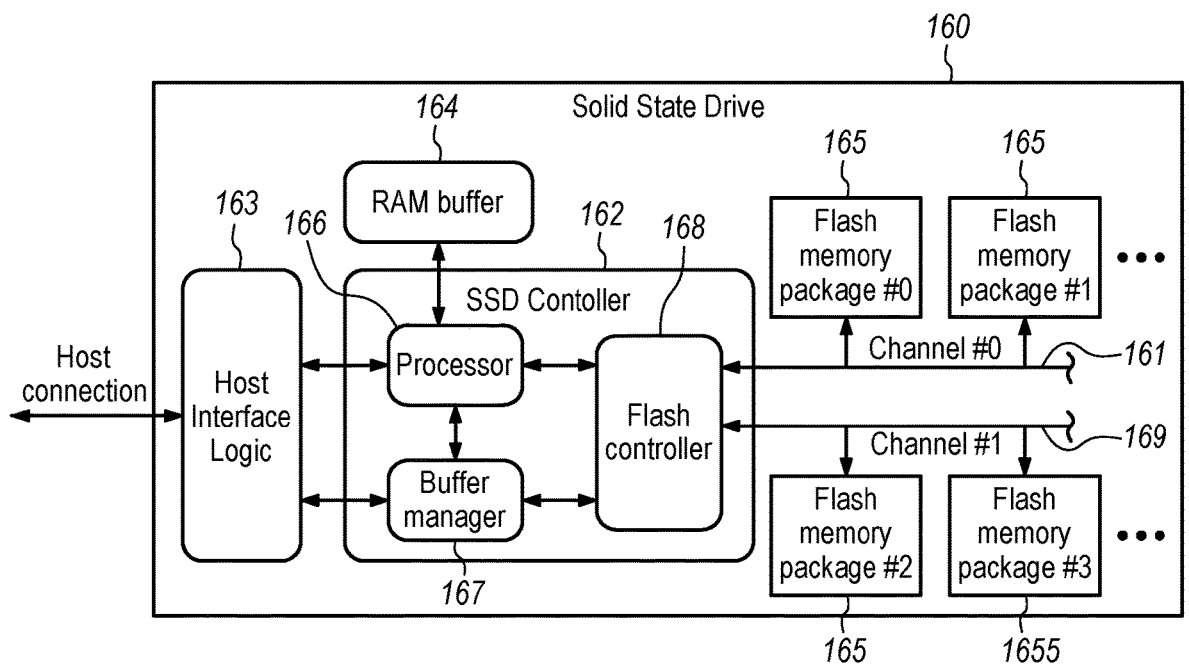

*FIG. 5*

Hard Disk Drive - Failure Domain Table

| Components | Failure Domain |
|---|---|
| Head 9 | Top Platter 5 |
| Platter 5 | Top Platter 5, Bottom Platter 5 |
| Head 10 | Bottom Platter 5 |
| Head 11 | Top Platter 6 |
| Platter 6 | Top Platter 6, Bottom Platter 6 |
| Head 12 | Bottom Platter 6 |
| Actuator 3 | Top Platter 5, Bottom Platter 5, Top Platter 6, Bottom Platter 6 |
| Head 13 | Top Platter 7 |
| Platter 7 | Top Platter 7, Bottom Platter 7 |
| Head 14 | Bottom Platter 7 |
| Head 15 | Top Platter 8 |
| Platter 8 | Top Platter 8, Bottom Platter 8 |
| ⋮ | |

*FIG. 6*

RAID Stripe Virtual Assignment Table

| Stripe ID | Stripe Unit Locations | | | |
|---|---|---|---|---|
| | SU-1 | SU-2 | SU-3 | SU-4 |
| S11 | D1/P6/Top | ~~D2/P6/Top~~ D2/P9/Bott. | D3/P6/Top | D4/P6/Top |
| S12 | D1/P6/Bott. | D2/P6/Bott. | D3/P6/Bott. | D4/P6/Bott. |
| S13 | D1/P7/Top | D2/P7/Top | D3/P7/Top | ~~D4/P7/Top~~ D1/P10/Top |
| S14 | D1/P7/Bott. | D2/P7/Bott. | D3/P7/Bott. | ~~D4/P7/Bott.~~ D2/P10/Top |
| S15 | D1/P8/Top | D2/P8/Top | D3/P8/Top | ~~D4/P8/Top~~ D3/P10/Top |
| S16 | D1/P8/Bott. | D2/P8/Bott. | D3/P8/Bott. | ~~D4/P8/Bott.~~ D4/P10/Top |
| S17 | | | | |

*FIG. 8*

Recovery Action Log

| Entry # | Date | Drive ID | Description of Action |
|---|---|---|---|
| 1 | | D2 | P6/Top → D2/P9/Bott. |
| 2 | | D4 | P7/Top → D1/P10/Top |
| 3 | | D4 | P7/Bott. → D2/P10/Top |
| 4 | | D4 | P8/Top → D3/P10/Top |
| 5 | | D4 | P8/Bott. → D4/P10/Top |
| | | | |

*FIG. 9*

DATA REGENERATION AND STORAGE IN A RAID STORAGE SYSTEM

BACKGROUND

The present disclosure relates to the use and management of a data storage system implementing a redundant array of independent disks (RAID).

BACKGROUND OF THE RELATED ART

A Redundant Array of Independent Disks (RAID), alternatively referred to as Redundant Array of Inexpensive Disks, is a data virtualization technology that combines multiple physical drives into one or more logical units for the purposes of data redundancy, performance improvement or both. Data is distributed across the drives in one of several ways, referred to as RAID levels, depending on the required level of redundancy and performance.

Although a RAID array may be configured to provide some minimum level of redundancy, if one of the drives or disks becomes compromised due a component failure, then the minimum level of redundancy may be negated until the compromised drive has been replaced and the data has been rebuilt and stored on the replacement drive. Accordingly, a network administrator will endeavor to immediately replace a drive within the RAID array as soon as the drive is indicated to have any type or extent of failure.

The motivation for immediate replacement of the drive is that a RAID system typically evenly distributes RAID stripes across all of the drives in the RAID array. In the event of the loss of a stripe due to a component failure within one of the drives, such as a head failure or platter failure within a hard disk drive (HDD), the overall data in that stripe is at increased risk of loss until that stripe is recovered/rebuilt. In other words, the RAID array is designed with a desired level of redundancy, but the failure of a single head or a single platter causes the stripe to lose that desired level of redundancy until the HDD is replaced and the data has been rebuilt.

BRIEF SUMMARY

Some embodiments provide a computer program product comprising a non-volatile computer readable medium and non-transitory program instructions embodied therein, the program instructions being configured to be executable by a processor to cause the processor to perform various operations. The operations comprise identifying, via communication with a RAID controller that manages operation of an array of drives as a RAID storage system, one of the drives that has been compromised and a failed component of the identified drive that compromised the identified drive and identifying a failure domain associated with the failed component, wherein data stored within the failure domain associated with the failed component has become inaccessible. The operations further comprise instructing, in response to the failed component having a failure domain that satisfies a first condition, the RAID controller to perform a first recovery action that includes regenerating the inaccessible data using data from other drives within the array of drives and storing the regenerated data on available storage of the identified drive outside the failure domain associated with the failed component.

Some embodiments provide a computer program product comprising a non-volatile computer readable medium and non-transitory program instructions embodied therein, the program instructions being configured to be executable by a processor to cause the processor to perform various operations. The operations comprise identifying, via communication with a RAID controller that manages the operation of an array of drives as a RAID storage system, one of the drives that has been compromised and a failed component of the identified drive that compromised the identified drive and identifying a failure domain associated with the failed component, wherein data stored within the failure domain associated with the failed component has become inaccessible. The operations further comprise instructing the RAID controller to regenerate the inaccessible data using data from other drives within the array of drives and store the regenerated data on a separate RAID stripe stored across a plurality of the drives in the array of drives.

BRIEF DESCRIPTION OF THE SEVERAL VIEWS OF THE DRAWINGS

FIG. 5 is a diagram of a solid-state drive.

FIG. 6 is an illustration of a failure domain table for a hard disk drive.

FIG. 8 is a RAID stripe virtual assignment table showing changes made to reflect the recovery actions performed in FIG. 7.

FIG. 9 is a recovery action log showing the recovery actions performed in FIG. 7.

DETAILED DESCRIPTION

Figure 1:
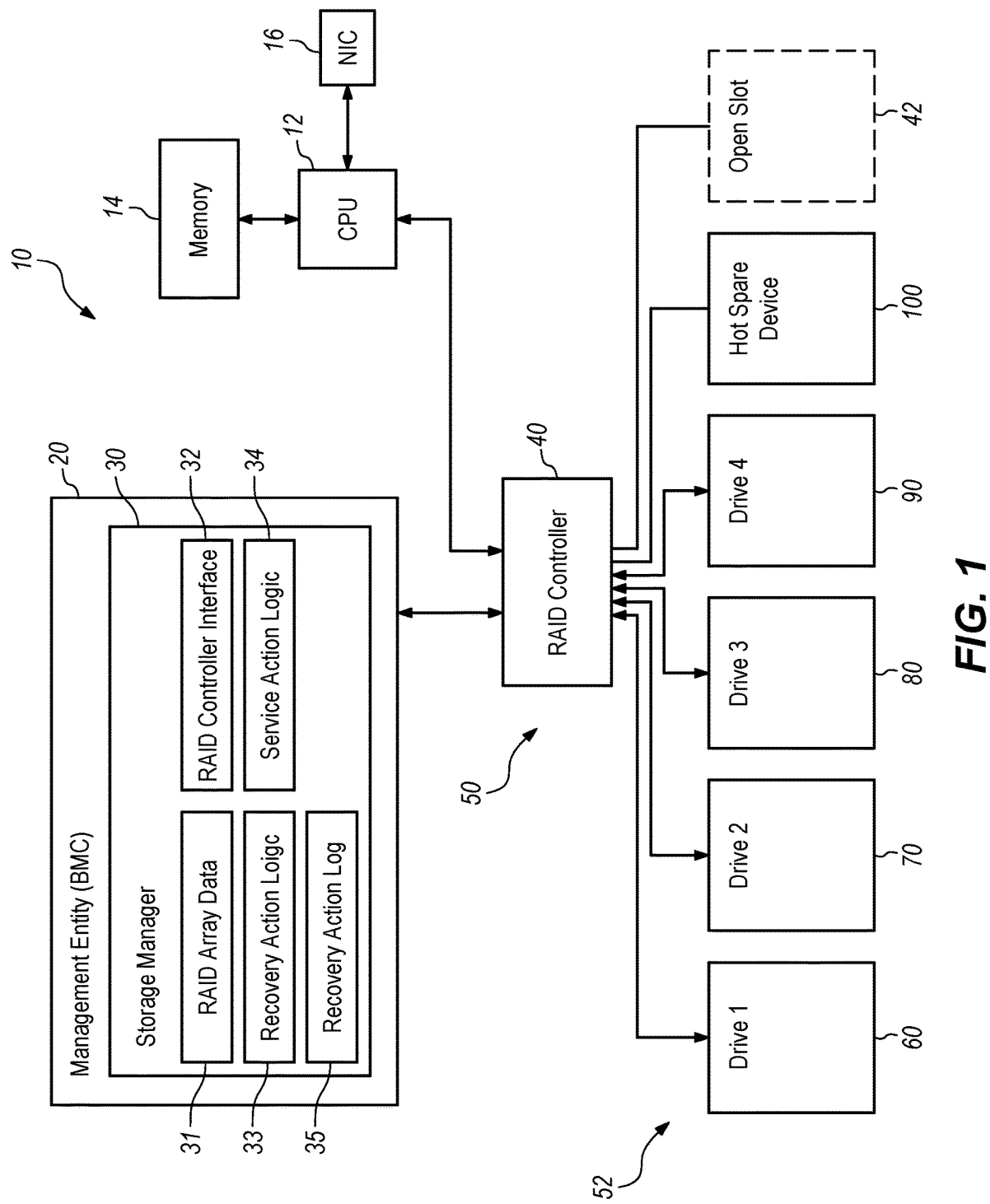
FIG. 1 is a diagram of a computing system including a RAID storage system.

Some embodiments provide a computer program product comprising a non-volatile computer readable medium and non-transitory program instructions embodied therein, the program instructions being configured to be executable by a processor to cause the processor to perform various operations. The operations comprise identifying, via communication with a RAID controller that manages operation of an array of drives as a RAID storage system, one of the drives that has been compromised and a failed component of the identified drive that compromised the identified drive and identifying a failure domain associated with the failed component, wherein data stored within the failure domain associated with the failed component has become inaccessible. The operations further comprise instructing, in response to the failed component having a failure domain that satisfies a first condition, the RAID controller to perform a first recovery action that includes regenerating the inaccessible data using data from other drives within the array of drives and storing the regenerated data on available storage of the identified drive outside the failure domain associated with the failed component.

In some embodiments, the processor that executes the program instructions and performs the operations is a central processing unit of a system management entity, such as a baseboard management controller (BMC) or field-programmable gate array (FPGA). One example of a baseboard management controller having enhanced capabilities is the Lenovo XClarity Controller (XCC). A baseboard management controller may manage the operation of an individual computing node and may report on the status and operation of the individual computing node and its components. In the present embodiments, the baseboard management controller may communicate with a RAID controller, such as by receiving information from the RAID controller about the array of drives and by instructing the RAID controller to perform operations on one or more of the drives in the array of drives. While the RAID controller may handle the basic control over the input and output of data to and from the array of drives in order to implement a particular RAID level, the baseboard management controller may perform operations that may improve one or more aspect of the performance of the RAID storage system by implementing one or more embodiment.

The RAID storage system includes an array of drives. The drives are data storage devices, such as hard disk drives (HDDs) and/or solid-state drives (SSDs). For example, each hard disk drive (HDD) may have a controller, a spindle, multiple actuators, multiple platters and multiple heads. The HDD controller may have the ability to identify a failed HDD component, such as a specific head, specific platter, specific actuator, the spindle and/or the controller. In another example, each solid-state drive (SSD) may have a controller, multiple channels, and multiple flash memory chips or packages on each channel. One example of a solid-state drive will utilize flash memory chips, such as NAND flash memory chips, for data storage. While a solid-state drive does not have moving parts as does a hard disk drive, a solid-state drive still experiences memory wear, such as a limit on the number of program/erase cycles before the integrity of the solid-state memory deteriorates. The SSD controller may have the ability to identify a failed SSD component, such as a specific flash memory chip, specific channel, or the controller. A "failed" SSD component may include any SSD component that is no longer reliable.

The RAID controller may be implemented as a hardware device or software program used to manage a plurality of hard disk drives or solid-state drives in a computer or storage array so that the drives work as a logical unit. A RAID controller may implement a RAID level to provide one or more performance benefit, such as data reliability, availability, performance and capacity. For example, embodiments of the RAID controller may implement basic or complex RAID levels, variants and techniques, including level RAID 0 through 6, nested RAID and other non-standard RAID level variants. Embodiments of the RAID controller communicate with the system management entity, including providing information about the RAID array, such as the RAID level being implemented, the array of drives available, the data storage capacity, available storage capacity, drive components and failure domains, and drive component failures. Furthermore, the RAID controller may receive and implement instructions received from the management entity and may receive and respond to requests from the management entity. In one option, the RAID controller may be a hardware device in the form of an expansion card.

In some embodiments, the operation of identifying the failure domain associated with the failed component may include accessing stored information that, for each of a plurality of components of the identified drive, identifies a failure domain associated with the identified component and an amount of storage capacity associated with the failure domain. The stored information may be stored by the RAID controller and/or the management entity. The stored information may reflect that there are various potential failure domains within an individual drive and that there is a certain impact associated with each failure domain. In a non-limiting example where the drive is a hard disk drive (HDD), failure of a spindle and/or a controller of the HDD (i.e., the failure domain) may cause loss of (i.e., impact) the entire storage capacity of the HDD, failure of a platter within the HDD may cause loss of the storage capacity of the failed platter, and the failure of only a single head may cause loss of the storage capacity accessed by the failed head. Where the HDD has two heads that read and store data on each platter, such as one head reading and storing data on the top of the platter and the other head reading and storing data on the bottom of the platter, failure of a platter may cause a loss of twice the amount of storage capacity as the failure of a single head. Similarly, the impact of an actuator failure will depend upon how many platters or heads are associated with the actuator. In some embodiments, the array of drives may be hard disk drives, wherein each hard disk drive includes multiple heads, multiple platters and multiple actuators, and wherein the failed component of the identified hard disk drive is one of the heads, one of the platters or one of the actuators.

Some failures within the HDD may be correlated and some other failures may be uncorrelated, such that awareness of the HDD mechanism may be important. As an example of a correlated failure of multiple heads, a single actuator may control the movement of heads on both sides of two platters such that failure of the single actuator may impact four heads and the storage capacity associated with those four heads. While the four heads did not fail, these four heads are now ineffective because they are correlated to the failed actuator. As an example of an uncorrelated failure of multiple heads, two of four heads on the same actuator may independently fail while the actuator remains operational. Embodiments may benefit from having access to stored information that reflects the amount and identify of lost storage capacity resulting from any specific component failure.

In some embodiments, the first condition may be that the failure domain is less than an available storage capacity of the identified drive. Accordingly, in response to the failed component having a failure domain that satisfies the first condition, the operations include instructing the RAID controller to perform a first recovery action that includes regenerating the inaccessible data using data from other drives within the array of drives and storing the regenerated data on available storage of the identified drive outside the failure domain associated with the failed component. In some embodiments, the first condition may be that the failure domain is less than an amount of the available storage capacity of the identified drive less a predetermined storage capacity margin. The implementation of a predetermined storage capacity margin prevents the regenerated data from being stored on the identified drive if doing so will leave the identified drive with less available storage capacity than the predetermined storage capacity margin. A user may designate the amount of the predetermined storage capacity margin, such as to allow for some expected amount of additional demand for data storage on the identified drive. Optionally, the predetermined storage capacity margin may be expressed as an absolute amount of data storage capacity (i.e., some number of bytes) or as a percentage of the entire storage capacity of the identified drive. In some embodiments, a predetermined storage capacity margin may be additionally or independently implemented for the entire array of drives.

Some embodiments may further comprise identifying a storage location on the identified drive that has a sufficient amount of available storage capacity to store the regenerated data. Accordingly, instructing the RAID controller to perform the first recovery action may include instructing the RAID controller to store the regenerated data at the identified storage location.

In some embodiments, the RAID controller may support virtual assignment of RAID stripes by maintaining a data structure that maps, for each of a plurality of RAID stripes, a specific storage location for each stripe unit included in the RAID stripe. Therefore, the RAID controller may be instructed or caused to update the data structure to indicate that one or more stripe units previously stored in the failure domain associated with the failed component are now being stored in the identified storage location. The storage location of any one or more stripe units may be changed and the data structure may be updated to identify the current location of the one or more stripe units. The data structure is preferably maintained to always provide an accurate map of where each stripe unit is located. It is a technical advantage of various embodiments that a stripe unit may be relocated to any available storage location while maintaining the accessibility of the data within the stripe unit and maintaining the relationship of the stripe unit to the original stripe.

Some embodiments may further comprise maintaining a log of recovery actions performed on the array of drives. The log of recovery actions may be updated to include an entry for each recovery action, such as the first recovery action. For example, each entry in the log of recovery actions may identify the storage location of the failure domain associated with the failed component (i.e., the originating storage location of any stripe unit) and the identified storage location (i.e., the destination storage location of the stripe unit). In response to a component failure, the originating storage location of a particular stripe unit may be within the failure domain of the failed component and the destination storage location for the particular stripe unit may be any available storage location that is selected to store the particular strip unit. If the particular stripe unit is subsequently relocated during a second recovery action, the originating storage location for the second recovery action would be the destination storage location of the first recovery action. There is no limit to the number of recovery actions and associated relocations that may be performed for a stripe unit. In response to detecting that the identified drive is being evacuated to a hot spare drive, the management entity may instruct or cause the RAID controller to transfer the data stored in the identified storage location of the identified drive to a storage location on the hot spare drive that corresponds with the storage location of the failure domain on the identified drive. In other words, the recovery action is unrolled, undone or reversed while also moving the data from the identified drive to the hot spare drive. It is a technical benefit of various embodiments that the data from a failure domain can initially be regenerated and stored on the same drive as the failed component, yet when a hot spare is eventually activated or a replacement drive is eventually installed the data may be moved back to a storage location corresponding to the original storage location of the data in order to regain efficiencies associated with the original storage location of the stripe units.

Some embodiments may further comprise maintaining a log of recovery actions performed on the array of drives and updating the log of recovery actions to include a log entry for the first recovery action identifying the storage location of the failure domain associated with the failed component (i.e., the originating storage location) and the identified storage location (i.e., the destination storage location). In response to detecting that the identified drive has experienced a complete failure, the management entity may instruct or cause the RAID controller to regenerate the data that was stored on the identified drive using data from other drives within the array of drives and move, according to a reverse of the log entry for the first recovery action, the data that was stored in the identified storage location to a storage location on a replacement drive or hot spare drive that corresponds with the storage location of the failure domain associated with the failed component.

Some embodiments may further comprise instructing, in response to the failed component having a failure domain that satisfies a second condition, the RAID controller to perform a second recovery action. The second recovery action may include activating a hot spare drive managed by the RAID controller, regenerating the inaccessible data using data from other drives within the array of drives, storing the regenerated data on the activated hot spare drive, and transferring all data that is outside of the failure domain associated with the failed component from the identified drive to the activated hot spare drive. In one option, the second condition may be that the failure domain is greater than the available storage capacity of the identified drive. In another option, the second condition may be that the failure domain is greater than a difference of the available storage capacity of the identified drive less a predetermined storage capacity margin. In a further option, the second condition may be that the failure domain is greater than the available storage capacity of the array of drives. In yet another option the second condition may be that the failure domain is greater than a difference of the available storage capacity of the array of drives less a predetermined storage capacity margin.

Some embodiments may further comprise instructing, in response to the failed component having a failure domain that satisfies a third condition, the RAID controller to perform a third recovery action. The third recovery action may include regenerating the inaccessible data using data from other drives within the array of drives and storing the regenerated data in a new stripe across a plurality of the array of drives. In one option, the third condition may be that the failure domain is greater than the available storage capacity of the identified drive. In another option, the third condition may be that the failure domain is greater than a difference of the available storage capacity of the identified drive less a predetermined storage capacity margin. In another option, the new stripe may be a RAID configuration protecting the data of the new stripe against at least as many drive failures as a RAID configuration associated with the data stored in the failure domain of the failed component. The RAID configuration or level may be, but is not required to be, the same as the RAID configuration or level implemented on the array of drives. However, any difference in the RAID configuration or level will preferably protect the data of the new stripe against at least as many drive failures as would the RAID configuration or level originally implemented on the data stored in the failure domain of the failed component. For example, if the native configuration of the RAID storage system is RAID 6 then the rehosted data would need to survive two drive failures, but if the native configuration of the RAID system is RAID 5 then the rehosted data would only need to survive a single drive failure.

In some embodiments, identifying the failure domain associated with the failed component may include accessing stored information that, for each of a plurality of components of the identified drive, identifies a failure domain associated with the identified component and an amount of storage capacity associated with the failure domain. In one non-limiting example, the array of drives are hard disk drives, where each hard disk drive includes multiple heads, multiple platters and multiple actuators, and where the failed component of the identified hard disk drive is one of the heads, one of the platters or one of the actuators.

Some embodiments may further comprise determining whether the RAID storage system includes a hot spare drive and/or an open slot for adding another drive and delaying, in response to determining that the RAID storage system includes a hot spare drive and/or an open slot for adding another drive, a service action to replace the identified drive or a recovery action to evacuate data from the identified drive to the hot spare drive until the available storage capacity on the identified drive is less than a predetermined amount of available storage capacity. It should be recognized that the impact of a drive component failure increases, and the opportunity cost of repair increases, as drive capacities increase. For example, data available and system quality of service is most at risk during rebuild operations (i.e., regeneration and evacuation of data to a hot spare or replacement drive). It is a technical advantage that embodiments enable a rebuild operation to be delaying, thereby improving performance of the RAID storage system, minimizing a cost to maintain the system, extending the useful life of a drive having one or more failed component, and reducing risk of data loss.

Some embodiments may further comprise determining, after performed the first recovery action, a minimum number of points of failure in the array of drives that would result in loss of data and delaying a service action for the identified drive until the minimum number of points of failure is less than a predetermined number of points of failure.

Some embodiments may further comprise calculating a currently available amount of storage capacity across the array of drives, predicting an available amount of storage capacity across the array of drives over time based on the currently available amount of storage capacity on the array of drives and a historical average of data storage growth rate for the array of drives, and estimating a date when the predicted available storage capacity will be within a predetermined period of time or within a predetermined amount of storage capacity from reaching a predetermined storage capacity limit of the RAID storage system. A service action on the identified drive may then be scheduled for the estimated time. For example, the service action may include replacing the drive or activating a hot spare drive, then rebuilding the data from the identified drive to the replacement or hot spare drive.

Some embodiments may further comprise replacing the identified drive that has the failed component in response to a demand for storage capacity in the array of drives exceeding the amount of available storage capacity in the array of drives or exceeding the amount of available storage capacity in the array of drives less a predetermined storage capacity margin.

Some embodiments may further comprise receiving user input or user settings indicating whether a predetermined amount of storage capacity and/or reliability is to be strictly enforced. A recovery action to activate and use the hot spare drive and/or a service action to replace the identified drive may be immediately initiated in response to the user input or user settings indicating that the predetermined amount of storage capacity and/or reliability is to be strictly enforced. If the user input or user setting does not indicate strict enforcement of the predetermined amount of storage capacity and/or reliability, then any of the disclosed embodiments of recovery actions may be used to delay activation of the hot spare drive and/or replacement of the identified drive. In other words, embodiments that do not require strict enforcement may implement recovery actions that result in some marginal amount of reduced capacity or reliability.

Some embodiments provide a computer program product comprising a non-volatile computer readable medium and non-transitory program instructions embodied therein, the program instructions being configured to be executable by a processor to cause the processor to perform various operations. The operations comprise identifying, via communication with a RAID controller that manages the operation of an array of drives as a RAID storage system, one of the drives that has been compromised and a failed component of the identified drive that compromised the identified drive and identifying a failure domain associated with the failed component, wherein data stored within the failure domain associated with the failed component has become inaccessible. The operations further comprise instructing the RAID controller to regenerate the inaccessible data using data from other drives within the array of drives and store the regenerated data on a separate RAID stripe stored across a plurality of the drives in the array of drives.

The foregoing computer program products may further include program instructions for implementing or initiating any one or more aspects of other computer program products and methods described herein. Furthermore, the operations of the computer program products described herein may be implemented as methods. Still further, embodiments may be directed to an apparatus that executes the program instructions of the computer program products and performed the various operations. Even further, embodiments may be directed to a system that includes the apparatus as well as other devices and components described herein.

FIG. 1 is a diagram of a computing system 10 including a RAID storage system 50. The computing system 10, which may take the form of a server, may include a central processing unit 12, memory 14, and a network interface controller (NIC) 16. The computing system 10 further includes a management entity 20, which may be a baseboard management controller (BMC) or a field-programmable gate array (FPGA). The management entity 20 may execute program instructions to perform the operations of a storage manager 30. The operations of the storage manager 30 may be coded and organized in various manners but are illustrated as including various software modules. In the illustrated embodiment, the software modules of the storage manager 30 includes a RAID array data 31, RAID controller interface 32, recovery action logic 33, service action logic 34, and recovery action log 35.

The RAID array data 31 may store any information about the RAID storage system 50, including the array of drives 52, each of the individual drives 60, 70, 80, 90 within the array, and additional capabilities of the RAID storage system 50, such as any hot spare drive 100 and any open slot 42 available for installation of an additional drive. Much of the RAID array data 31 may be obtained from a RAID controller 40 that directly manages the array of drives 52 and communicates with the management entity 20. Specifically, the RAID controller 40 may share information about the array of drives 52 with the storage manager 30 of management entity 20 via a RAID controller interface 32 and may received instructions or queries from the storage manager 30 of management entity 20 via the RAID controller interface 32. Without limitation, the RAID array data 31 may include the RAID configuration or level being implemented on the array of drives 52, the number of active drives, any available hot spare, any open slots, and the storage capacity and architecture (i.e., number of platters, heads, actuators, etc.) of each drive 60, 70, 80, 90, 100. The RAID array data 31 enables the management entity 20 to determine a failure domain associated with a failure of any component of any of the drives and evaluate a risk of data loss, such as a number of drive failures that the data can withstand before data is lost. Furthermore, the RAID configuration or level may identify a minimum number of drive failures that the data should be able to withstand.

The recovery action logic 33 causes the management entity 20 to perform the operations of various recovery actions and determine which recovery action should be performed in response to detecting a failed component in view of the current conditions of the array of drives 52 and the RAID configuration or level being implemented. For example, the recovery action logic 33 may select a first recovery action in response to a failed component on a first drive if the first drive has 50% available storage capacity but select a second recovery action in response to the failed component on the first drive if the first drive has only 5% available storage capacity.

The service action logic 34 causes the management entity 20 to perform the operations to determine when and what service action(s) to take and then instruct the RAID controller and/or an administrative personnel to implement the service action(s). For example, the RAID controller may be instructed to activate a hot spare and rebuild/transfer data to the hot spare, whereas an administrative person may be notified to install an additional drive in an open slot or replace a particular one of the drive with a replacement drive.

The recovery action log 35 causes the management entity 20 to store a record of all recovery actions performed on the RAID array 52. For example, an entry may be made into the recovery action log 35 for each recovery action, where each entry may identify an originating storage location of data within a failure domain and a destination storage location of the data outside of the failure domain. The recovery action log 35 may be useful to facilitate unrolling or reversing the recovery actions taken on a particular drive when that particular drive is replaced or evacuated to a hot spare.

The management entity 20, such as a BMC, and the RAID controller 40 are in communication and work together to perform various operations and implement various embodiments. For example, the RAID controller may directly handle industry standard RAID functions while the BMC may execute program instructions to provide additional functionality to the system, including processing input received from the RAID controller and providing output to the RAID controller. For example, the BMC may collect data (receive input) from the RAID controller, such as the RAID array configuration, component failures, storage capacity, available storage capacity, and other information about the operation or condition of the RAID array, and the BMC may evaluate recovery options and provide instructions to the RAID controller. In one option, the BMC may identify the drives over which the RAID controller may stripe data regenerated from a failure domain while maintaining a prescribed level of redundancy, and then instruct the controller to stripe the regenerated data over the identified drives. In another example, the BMC may map out the unroll instructions when a service action has been performed, such as the replacement of the compromised drive. Furthermore, the BMC or other management entity 20 may, in conjunction with input from the RAID controller, evaluate the reliability of the RAID array and calculate the urgency of a service action on one or more of the drives.

The management entity may also monitor the storage capacity and use of the array of drives and trigger service actions as required. For example, the array health and capacity may be reflected in parameters selected from, without limitation, available (unused) storage capacity, drive predictive failures, historical frequency of component failures, and the storage capacity impact of the next predictive failure compared to the workload and expected needs of the array.

If a hot spare drive is available to the RAID controller and the BMC has detected a component failure in one of the original drives of the RAID array, then the BMC may determine whether to store or embed the regenerated/relocated data (i.e., the data from the failure domain associated with the failed component) on one or more of the active drives of the RAID array or to activate the hot spare drive. Under normal operations of the RAID storage system, any hot spare drive available to the RAID system is not in active use. However, in response to a failed component of one of the drives in the RAID system, the hot spare drive may be activated for use by the RAID system, such that data from the compromised drive may be migrated to the hot spare drive. After migrating data off the compromised drive, the RAID system may stop using the compromised drive, which is then preferably removed from the RAID system to make room for another hot spare drive.

The management entity may identify the internal components of each drive that could fail (i.e., "failure domains" within each drive of the RAID storage system), identify the specific storage area and capacity that is associated with each failure domain, and identify availability storage capacity in each failure domain. For each failure domain, some or all of the available storage capacity in that failure domain may be used as a dynamic pseudo-virtual storage regeneration relocation target. The dynamic pseudo-virtual storage regeneration relocation target is a place in the storage system that can be used to regenerate data that became inaccessible as a result of a component failure. This target storage area may be referred to as being "dynamic" because the location may be moved around or selected to satisfy the requirements of a current RAID level. The target storage area may be referred to as being "pseudo-virtual" because the RAID stripes can be allocated almost anywhere in a storage device. Finally, the term "regeneration" refers to the process of calculating the inaccessible data using corresponding data in other locations of the RAID storage system. For example, the data stored in an inaccessible stripe unit may be regenerated using data from other stripe units in the same stripe.

If the RAID system still has an open slot for adding another drive even after activating the existing hot spare drive, then there may be no urgency to evacuate data from a compromised drive. In other words, if a rebuild is still possible even in the event of another complete disk failure, then the drive with the failed component may not need to be removed. Rather, the drive with the failed component may be retained in the storage system to make use of the drive's remaining useful capacity, if any, outside the failure domain of the failed component. In this case, there is likely enough available capacity on the drive to tolerate additional head failures before an additional field-replaceable unit (FRU) dispatch, data evacuation and drive removal is required. In one option, the BMC may determine whether the RAID system has an open slot for another drive by comparing the total number of slots to the number of slots that are occupied by a drive. "Evacuation" of data from a compromised drive to another drive may include both regeneration and storage of the lost data that was within the failure domain of the failed component of the compromised drive and moving, migrating or copying data that was outside of the failure domain.

If there is no open slot available in the RAID system for installing a new hot spare drive once an existing hot spare drive is activated (and is no longer a "spare"), then the management entity may recommend ordering and installing a new hot spare drive (i.e., the new hot spare drive is a field replaceable unit) and identifies the existing (failed) drive that may be removed from the storage system to open up a slot for installation of the new hot spare drive.

Figure 2:
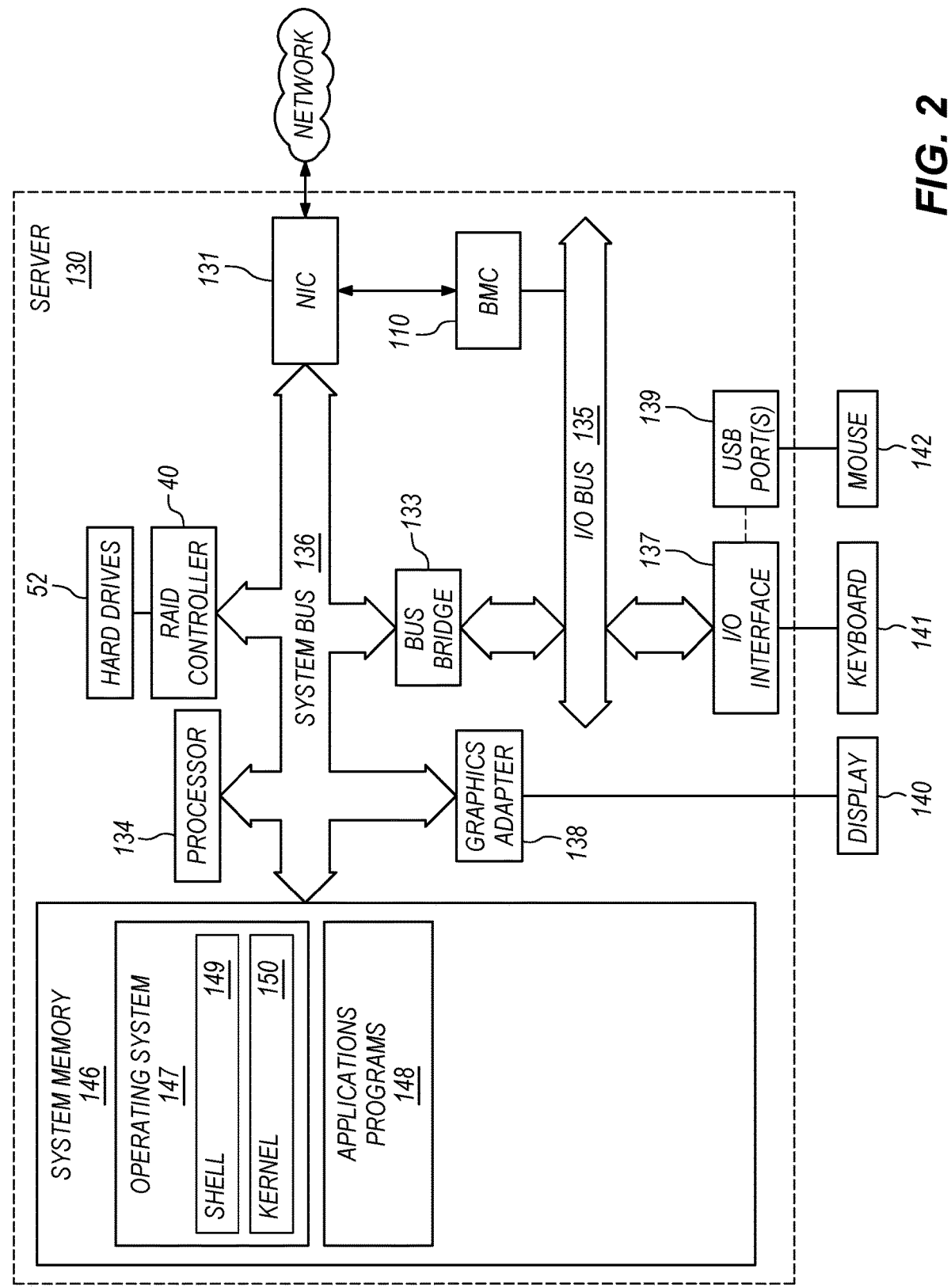
FIG. 2 is a diagram of computing system having a baseboard management controller in communication with a RAID controller according to some embodiments.

FIG. 2 is a diagram of computing system in the form of a server 130 having a baseboard management controller 110 in communication with a RAID controller 40 according to some embodiments. The server 130 includes a processor unit 134 that is coupled to a system bus 136. The processor unit 134 may include two or more central processing units, each of which has one or more cores. A graphics adapter 138, which may drive/support a display 140, is also coupled to the system bus 136. The graphics adapter 138 may, for example, include a graphics processing unit (GPU). The system bus 136 is coupled via a bus bridge 133 to an input/output (I/O) bus 135. An I/O interface 137 is coupled to the I/O bus 135. The I/O interface 137 affords communication with various I/O devices, such as a keyboard 141 (perhaps as a touch screen virtual keyboard), and a USB mouse 142 via USB port(s) 139 (or other type of pointing device, such as a trackpad). As depicted, the server 130 may communicate with other devices over the network 17 using a network adapter or network interface controller (NIC) 131, which may be a Smart NIC. The hardware elements depicted in the server 130 are not intended to be exhaustive, but rather are representative. For instance, the server 130 may further include non-volatile memory and the like.

The RAID controller 40 is also coupled to the system bus 136. The RAID controller 40 interfaces with the plurality of drives 52. In a preferred embodiment, the processor unit 134 may transfer data from the drives 52 to system memory 146, which is also coupled to the system bus 136. System memory is defined as the lowest level of volatile memory in the server 130. This volatile memory may include additional higher levels of volatile memory (not shown), including, but not limited to, cache memory, registers and buffers. Data that populates the system memory 146 may include an operating system (OS) 147 and application programs 148.

The operating system 147 includes a shell 149 for providing transparent user access to resources such as application programs 148. Generally, the shell 149 is a program that provides an interpreter and an interface between the user and the operating system. More specifically, the shell 149 executes commands that are entered into a command line user interface or from a file. Thus, the shell 149, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 150) for processing. Note that while the shell 149 may be a text-based, line-oriented user interface, embodiments may support other user interface modes, such as graphical, voice, gestural, etc.

As depicted, the operating system 147 also includes the kernel 150, which may include lower levels of functionality for the operating system 147, including providing essential services required by other parts of the operating system 147 and application programs 148. Such essential services may include memory management, process and task management, disk management, and mouse and keyboard management. As shown, the server 130 includes application programs 148 in the system memory of the server 130.

The server 130 further includes the baseboard management controller (BMC) 110, which may be located on a motherboard along with the processors 134. The BMC may be used to perform out-of-band processing and may monitor and manage various features of the hardware components of the server, including the RAID controller 40. The illustrated components of the server 130 are representative and should not be interpreted as limiting.

Figure 3:
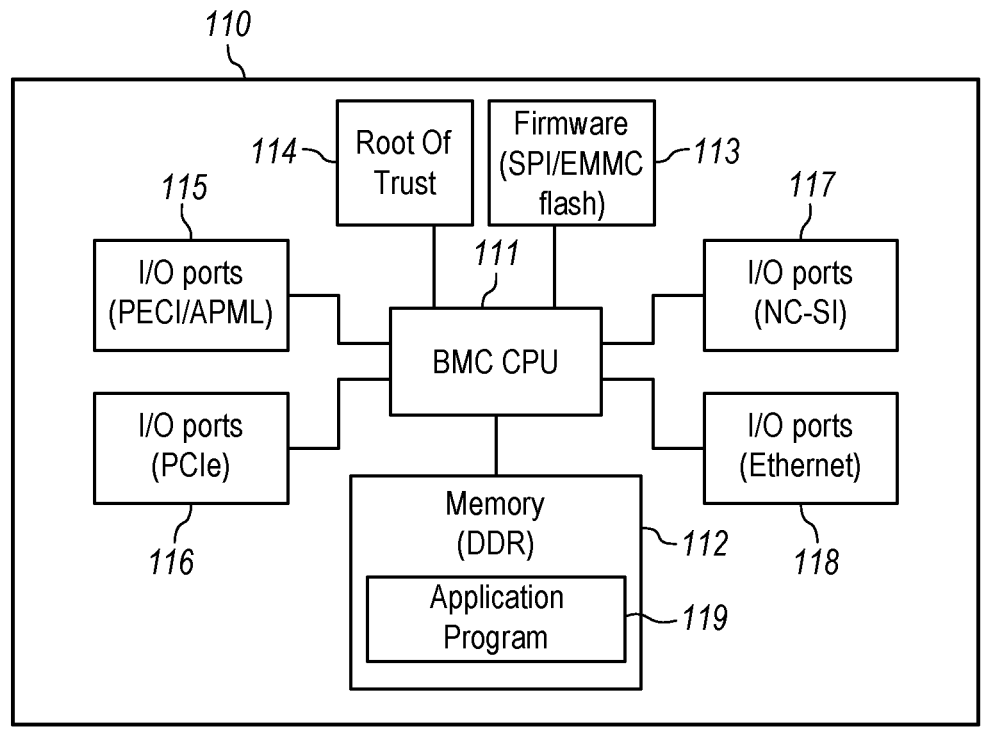
FIG. 3 is a diagram of a baseboard management controller according to some embodiments.

FIG. 3 is a diagram of a system management system, such as a baseboard management controller (BMC) 110 including a baseboard management controller central processing unit (BMC CPU) 111 according to some embodiments. The baseboard management controller 110 is intended to be representative of a management system that could be incorporated either on a control module or on a motherboard of the server 130 in FIG. 2. The baseboard management controller 110 is similar to a small computer or system on a chip (SoC), including the central processing unit (CPU) 111, memory 112 (such as random-access memory (RAM) on a double data rate (DDR) bus), firmware 113 on a flash memory (such as an embedded multi-media card (eMMC) flash memory or a serial peripheral interface (SPI) flash memory), and a Root of Trust (RoT) chip 114. The baseboard management controller 110 further includes a wide variety of input/output ports. For example, the input/output (I/O) ports may include I/O ports 115 to the hardware components of the server, such as a Platform Environment Control Interface (PECI) port and/or an Advanced Platform Management Link (APML) port; I/O ports 116 to the hardware components of the servers and/or a network interface controller (NIC), such as a Peripheral Component Interconnect Express (PCIe) port; I/O ports 117 to the NIC, such as a network controller sideband interface (NC-SI) port; and I/O ports 118 to a network that accessible to an external user, such as an Ethernet port. The BMC CPU 111 of the baseboard management controller 110 may execute an application program 119 causing the BMC CPU 111 to use any one or more of these I/O ports to interact with hardware devices installed on the server, such as the RAID controller 40 in FIG. 2.

Figure 4:
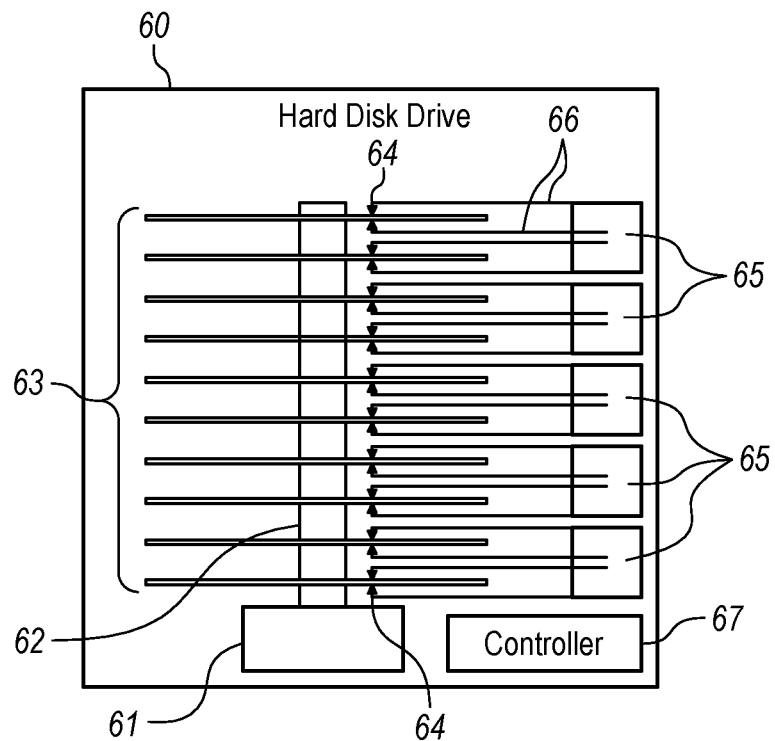
FIG. 4 is a diagram of a hard disk drive.

FIG. 4 is a diagram of an individual hard disk drive 60. Although the construction of the hard disk drive (HDD) may vary, the diagram is representative of the drives 60, 70, 80, 90, 100 of FIG. 1 (collectively, drives 52). The HDD 60 includes a spindle motor 61 that turns a spindle 62 attached to a plurality of disk-shaped platters 63. Each platter 63 is coated with a magnetic material that is capable of storing data. Rotating of the spindle causes the platters to rotate between heads 64 (illustrated as triangles) that are coupled to an actuator 65 by an arm 66. The illustrated HDD 60 includes ten platters 63, twenty heads 64 and five actuators 65. There are two heads 64 per platter 63 because one head 64 is positioned above the platter to read/write magnetic material on the top surface of the platter and another head 64 is positioned below the platter to read/write magnetic material on the bottom surface of the platter. The illustrated HDD 60 provides one actuator 65 for four heads 64 corresponding to two adjacent platters 63. The RAID controller 40 of FIG. 1 is able to detect a component failure within the HDD 60, such as a specific head 64, specific platter 63, specific actuator 65, spindle/motor 61, 62 and/or a HDD controller 67 that controls the spindle motor 61 and actuators 65, as well as input/output to/from the heads 64.

In one example, if a single head on a 10-platter (20 head) HDD fails, typical service strategies declare that the HDD has failed and indicate that the HDD must be replaced immediately. The replacement procedure for replacing the failed HDD initiates a rebuilding and transfer of around 20 TB of data (assuming a 20 TB HDD) from the failed HDD to a replacement HDD. The failed HDD is subsequently discarded despite the fact that the failed HDD still has nearly 19 TB of fully functioning and accessible storage media (because 19 of 20 heads are still working). The term "rebuild" refers to the process of using predetermined RAID algorithms and data, including parity data, from other HDDs in the RAID array to reconstruct the lost or inaccessible data.

In a further example, the RAID storage system may be configured as a RAID 5 array implemented on four 20 TB hard disk drives (HDDs), wherein each HDD includes 10 platters and 20 heads. This array has an (n–1)/n capacity factor or 60 TB of data and can tolerate one (1) HDD failure when the storage system is in a virgin, fully functional state. The management entity operations may improve management of the RAID storage system in the event of a failure of a head, platter or actuator of any HDD within the storage system.

Embodiments recognize that there are various potential failure domains within an individual HDD or similar device and that there are certain impacts associated with each failure domain. The failure of a spindle and/or controller of the HDD (i.e., the failure domain) may cause loss of (i.e., impact) the entire capacity of the HDD. The failure of a single platter within the HDD may cause loss of the storage capacity of the failed platter (i.e., the equivalent of the loss of 2 heads). The failure of a single head, leaving all of the remaining heads operational, may impact the storage capacity accessed by the failed head, such as one side of a platter.

FIG. 5 is a diagram of a solid-state drive (SSD) 160. The SSD 160 includes an SSD controller 162 that communicates with a host, such as the RAID controller, via host interface logic 163, is connected to Random Access Memory (RAM) buffer 164, and handled input/output to/from the flash memory chips 165. The SSD controller 162 includes a processor 166, a buffer manager 167, and a flash controller 168. The flash controller 168 communicates with one set of the flash memory chips 165 via a first channel 161 and a second set of the flash memory chips 165 via a second channel 169. An individual flash memory chip 165 has a failure domain equal to the storage capacity of the individual flash memory chip, an individual channel 161, 169 has a failure domain equal to the storage capacity of all of the flash memory chips on the individual channel, and the flash controller 168 or SSD controller 162 has a failure domain of the entire storage capacity of the SSD 160. The SSD controller 162 may communicate with a RAID controller 40 (see FIG. 1) in the same or similar manner described herein for a HDD controller 67 (see FIG. 4).

FIG. 6 is an illustration of a failure domain table for a hard disk drive, such as the hard disk drive 60 of FIG. 4. The failure domain table includes a first column that identifies a component of the HHD 60 and a second column that identifies the failure domain associated with the component in the same row of the table. While the failure domain is shown referencing one or more portion of a platter, a failure domain table may reference a failure domain by a range of storage addresses or any other description that identifies the portion of the hard disk drive storage media that can only be accessed if the component is function. In the first row of the table, the head 9 (a 9th head of a HDD) is shown to have a failure domain of the top side of Platter 5 (a first side of the 5th platter of the HDD). In a second row of the table, Platter 5 is shown to have a failure domain of the top side of Platter 5 and also the bottom side of Platter 5 (a second side of the 5th platter of the HDD). In the seventh row of the table, Actuator 3 is shown to have a failure domain equal to the top and bottom sides of both Platter 5 and Platter 6. The failure domain table may be part of the RAID array data 31 stored or accessed by the management entity 20 as shown in FIG. 1.

Figure 7:
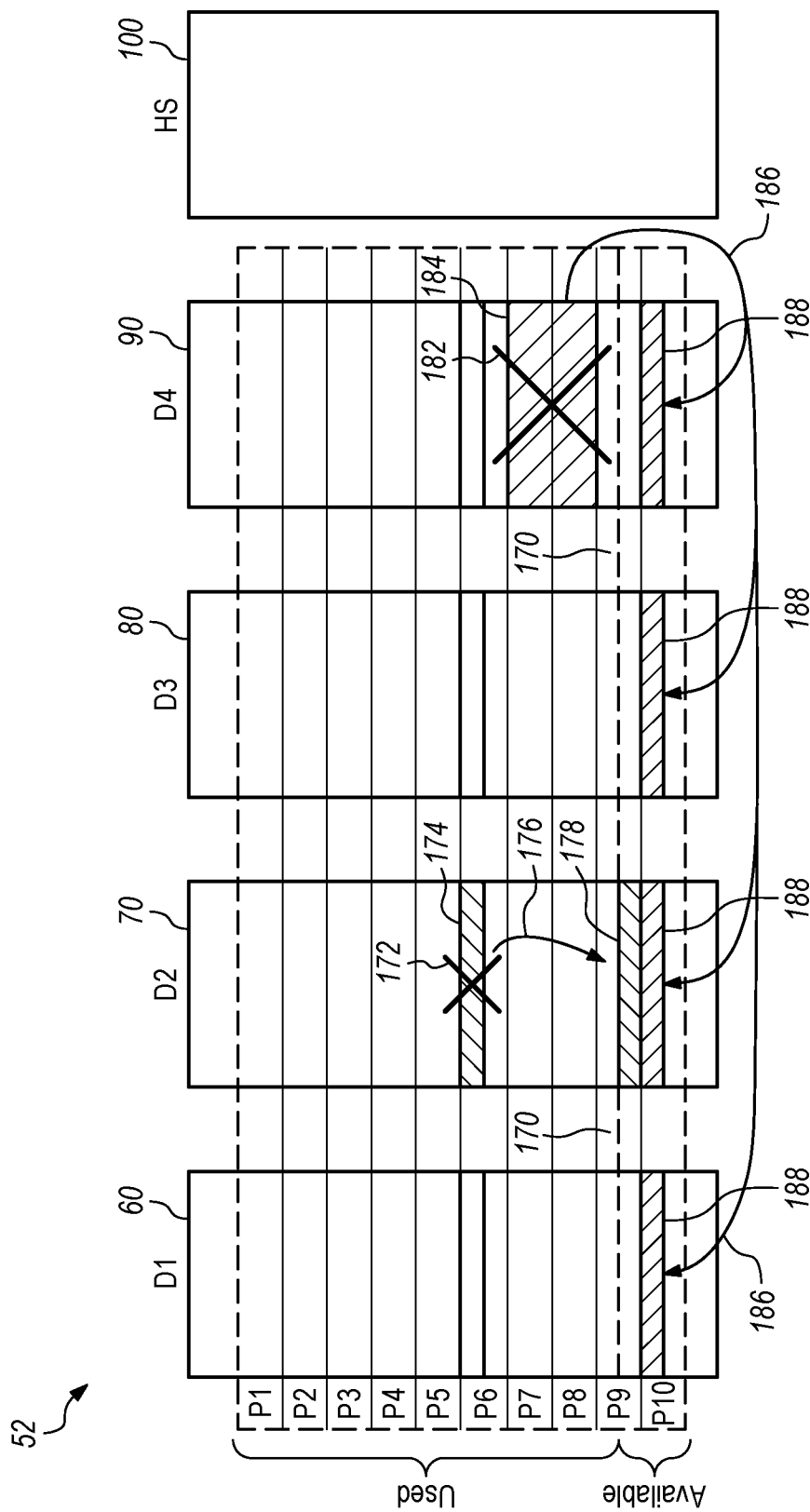
FIG. 7 is a diagram of an array of drives where two recovery actions are performed in response to two failed components on two separate drives.

FIG. 7 is a diagram of an array of drives, including drive D1 60, drive D2 70, drive D3 80, drive D4 90, and a hot spare drive HS 100 that are under the control of the RAID controller 40 as shown in FIG. 1. Consistent with the diagram of a hard disk drive (HDD) 60 in FIG. 4, the storage capacity of each drive is illustrated as being divided up among ten platters, referenced from top to bottom as P1-P10 (see references on the left-hand side). Note that the amount of used storage capacity on each drive is illustrated as consuming the first 8 and ½ platters as demarcated by a dashed line 170 (and the word "used" on the left-hand side of FIG. 7). Accordingly, the amount of available storage capacity on each drive is illustrated as including the last 1 and ½ platters (below the dashed line 170 and labeled with the word "available" on the left-hand side of FIG. 7). Note that the hot spare drive HS 100 has not been activated.

The management entity 20 (see FIG. 1) may identify, via communication with a RAID controller 40 (see FIG. 1) that manages operation of the array of drives 52 as a RAID storage system, one of the drives (D2) 70 that has been compromised and a failed component (head 64 positioned to read/write the top surface of Platter 6 63 of FIG. 4) of the identified drive 70 (constructed consistent with drive 60 of FIG. 4) that compromised the identified drive. In FIG. 7, the failed component is illustrated by a large "X" 172 over the area of a failed head). The management entity 20 (see FIG. 1) may also identifying a failure domain 174 (illustrated as the area with diagonal lines) associated with the failed component, wherein data stored within the failure domain 174 associated with the failed component has become inaccessible. The management entity 20 (see FIG. 1) may then instruct, in response to the failed component having a failure domain that satisfies a first condition, the RAID controller 40 (see FIG. 1) to perform a first recovery action 176 that includes regenerating the inaccessible data using data from other drives D1 60, D3 80, and D4 90 within the array of drives and storing the regenerated data on available storage 178 (illustrated as the available area with diagonal lines) of the identified drive 70 outside the failure domain 174 associated with the failed component. The first condition may be, without limitation, that the size of the failure domain is less than an available storage capacity of the identified drive.

Subsequently, the management entity 20 (see FIG. 1) may identify, via communication with a RAID controller 40 (see FIG. 1) that manages operation of the array of drives 52 as a RAID storage system, one of the drives (D4) 90 that has been compromised and a failed component (an actuator 65 positioned to read/write the top and bottom surfaces of Platter 7 and Platter 8 63 of FIG. 4) of the identified drive 90 (constructed consistent with drive 60 of FIG. 4) that compromised the identified drive. In FIG. 7, the failed component is illustrated by a large "X" 182 over the storage area associated with the failed actuator 65). The management entity 20 (see FIG. 1) may also identifying a failure domain 184 (illustrated as the area with diagonal lines) associated with the failed component, wherein data stored within the failure domain 184 associated with the failed component has become inaccessible. The management entity 20 (see FIG. 1) may then instruct, in response to the failed component having a failure domain that satisfies a second condition, the RAID controller 40 (see FIG. 1) to perform a second recovery action 186 that includes regenerating the inaccessible data using data from other drives D1 60, D2 70, and D3 80 within the array of drives and storing the regenerated data on available storage 188 (illustrated as the available area with diagonal lines) of the identified drive 70 outside the failure domain 174 associated with the failed component. The second condition may be, without limitation, that the size of the failure domain is less than an available storage capacity of the identified drive. Note that the second recovery action caused the data from the failure domain 174 to be striped as stripe units 188 stored in the available storage capacity of the four drives D1 60, D2 70, D3 80 and D4 90. Also note that the hot spare drive HS 100 has still not been activated but remains on standby in case it becomes necessary to rebuild one of the drives to the hot spare drive.

Whereas the "hot spare drive" is a physical drive that is connected to the RAID controller but is not yet activated or turned on, a "hot spare area" is storage space within the RAID array that is not already occupied with data and is logically available to be used for rebuilding the data that became inaccessible due to a component failure. The hot spare area may be referred to as a "virtual" hot spare because the location is determined by logical analysis of the RAID array and configuration. For example, the BMC and/or the RAID controller may determine whether there is enough storage space available in the RAID array to restripe the recreated data over the remaining drives without constraining the storage capacity of the RAID array to the point that it is necessary to use a hot spare drive.

FIG. 8 is a diagram of a RAID stripe virtual assignment table showing changes made to reflect the recovery actions 176, 186 performed in FIG. 7. The RAID stripe virtual assignment table may be maintained by the RAID controller 40 (see FIG. 1) to be consulted during read/write operations to identify the location of individual stripe units, whether those stripe units have been relocated or not. Optionally, the RAID stripe virtual assignment table may also become part of the RAID array data 31 accessible to the management entity 20 (see FIG. 1). Virtual assignment of RAID stripes means that the RAID stripe units can be stored individually in a failure domain of choice, rather than the RAID stripe units being hard mapped to a particular HDD/failure domain/stripe location.

In reference to the RAID stripe virtual assignment table, each RAID stripe has four stripe units SU-1, SU-2, SU-3 and SU-4. The table includes a record (row) for each RAID strip, where each record identifies the storage location of the four strip units. The first record (row) identifies that the RAID stripe with a Stripe ID of S11 has four stripe units SU-1, SU-2, SU-3 and SU-4, wherein SU-1 is located on disk D1, platter P6, top surface (i.e., head 11); SU-2 is located on disk D2, platter P6, top surface (i.e., head 11); SU-3 is located on disk D3, platter P6, top surface (i.e., head 11); and SU-4 is located on disk D4, platter P6, top surface (i.e., head 11).

However, as illustrated by the strikethrough of the original location of SU-2, SU-2 is shown to have been relocated (according to the recovery action 176 of FIG. 7) to disk D2, platter P9, bottom surface (i.e., head 18). During any subsequent read or write operations to the Stripe S11, the RAID controller will first consult the RAID stripe virtual assignment table to obtain the storage location of each stripe unit in the Stripe S11 and then access the indicated storage locations as required to read/write to the Stripe S11.

The RAID stripe virtual assignment table includes further strikethroughs to illustrate the recovery action 186 of FIG. 7. Specifically, Stripe Units SU4 of Stripes S13, S14, S15 and S16 have been updated to reflect the current storage location of the regenerated data for each of these Stripe Units. Again, the references to disks, platters and platter surfaces may be replaced with storage addresses or other types of location indicators.

FIG. 9 is a recovery action log showing the recovery actions performed in FIG. 7. The non-limiting illustration of a recovery action log includes a sequence of entries (rows), where each entry identifies the original drive ID of data that was the subject of a recovery action. For example, the first entry records the recovery action 176 of FIG. 7, regenerated and relocated data from disk D2, platter P6, top surface (i.e., head 11) to disk D2, platter P9, bottom surface (i.e., head 18). Accordingly, should disk D2 be subsequently replaced or evacuated to a hot spare drive, the recovery action identified in entry 1 would be unrolled or reversed, such that data from disk D2, platter P9, bottom surface (i.e., head 18) would be transferred to, or regenerated and stored to, platter P6, top surface (i.e., head 11) of the replacement drive or hot spare drive. Similarly, the entries 2-5 document the recovery action 186 of FIG. 7 and would be used to unroll or reverse these recovery actions should the disk D4 be replaced or evacuated to a hot spare drive.

It should be appreciated that a more complex history or log of recovery actions may exist as a result of multiple, sequential component failures. Accordingly, the recovery action log could have nested recovery actions where data has been regenerated and/or transferred some number of times. Therefore, it may be important in some instances to unroll or reverse recovery actions in reverse order chronological order, such that the most recent recovery actions involving a drive that is being replaced or evacuated are unrolled or reversed prior to unrolling or reversing previous recovery actions involving that drive. It should also be appreciated that if sufficient memory is available, it may not be necessary to actually to perform a write operation for each recovery action that is unrolled or reversed. Rather, it may be possible to perform multiple unrolling or reversing steps in memory and then make a single write of the data to the replacement drive or hot spare drive.

Embodiments of the recovery action logic may verify that the data reliability associated with a given RAID level is preserved through any one or more recovery actions. For example, a recovery action that would result in a violation of the data reliability required by the current RAID level may be avoided in favor of some other recovery action. In other words, if the RAID array is configured with a RAID level requiring that all data could survive two major failures, then the regenerated data should also be stored in a location and manner so that the data will survive two major failures. "Nesting of failure recovery actions" indicates that a first failure has caused data to be regenerated and moved to a first new location, and then a second failure causes that data to get regenerated and moved to a second new location.

Figure 10:
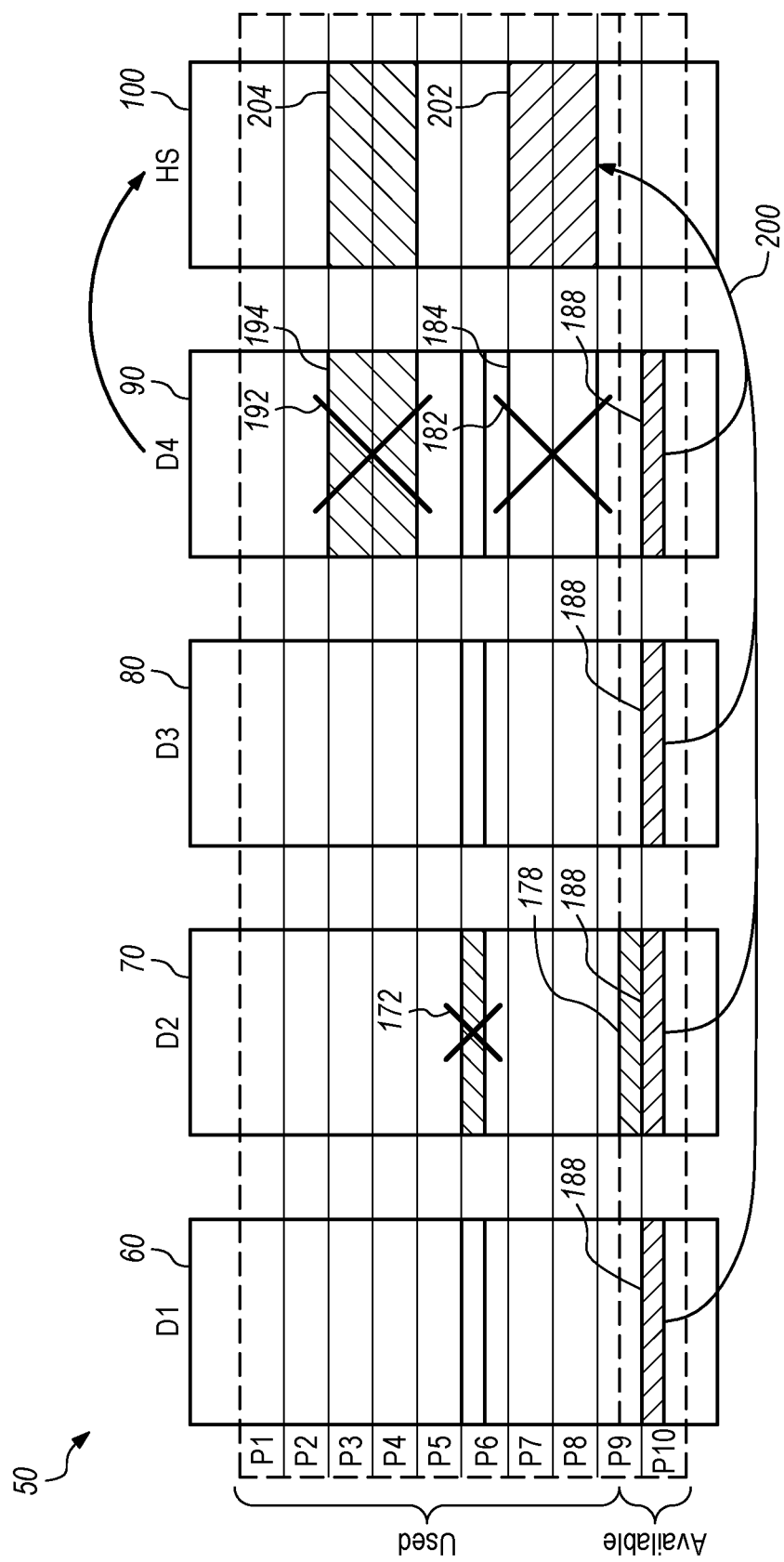
FIG. 10 is a diagram of the array of drives of FIG. 7 following a third failed component and the activation of a hot spare drive.

FIG. 10 is a diagram of the array of drives 52 of FIG. 7 following a third component failure and the activation of a hot spare drive HS 100. Note that the previously failed components 172, 182 are still shown as failed (illustrated by the large "X"), and the relocated data or stripe units 178, 188 are still shown in their respective storage locations. However, a third component failure 192 (illustrated by another large "X") has now occurred and the amount of storage associated with the failure domain 194 would, if relocated to the available storage of the individual drive D4 90 and/or to the available storage of the other drives in the array 52, violate a condition established for the RAID storage system, such as a predetermined minimum amount of available storage capacity. Accordingly, the management entity may determine that drive D4 90 should be evacuated to the hot spare drive HS 100.

Accordingly, the management entity may instruct the RAID controller to activate the hot spare drive 100 and initiate a process to unroll the previous recovery actions. To "unroll" one or more recovery actions means to reverse or undue the previously implemented recovery actions so that any inefficiencies associated with those recovery actions do not become permanent. This unrolling of previous recovery actions is beneficial to achieve the original space efficiency. For example, if a recovery action caused certain data to be embedded on the remaining drives according to a RAID of some calculated level to protect against loss of data with a failure, continued use of this embedded RAID remains less space efficient than of the original RAID configuration.

The management entity may instruct the RAID controller to unroll the recovery actions involving drive D4 (i.e., the drive being evacuated and then replaced) in reverse chronological order, preferably referring to the recovery action log (see FIG. 9). Accordingly, after activating the hot spare drive HS 100, the RAID controller may unroll or reverse entry 5 in the recovery action log by moving the data at drive D4, platter P10, top surface to the platter P8, bottom surface of the hot spare drive. Next, the RAID controller may unroll or reverse entry 4 in the recovery action log by moving the data at drive D3, platter P10, top surface to the platter P8, top surface of the hot spare drive; unroll or reverse entry 3 in the recovery action log by moving the data at drive D2, platter P10, top surface to the platter P7, bottom surface of the hot spare drive; and unroll or reverse entry 2 in the recovery action log by moving the data at drive D1, platter P10, top surface to the platter P7, top surface of the hot spare drive. The net effect of unrolling recovery actions is, as illustrated by arrow 200, to move the data from the four stripe units 188 to the storage area 202 on the hot spare drive 100. Note that this storage area 202 on the hot spare drive 100 corresponds with the storage area 184 of the drive D4 90. Also note that the storage area 178 on drive D2 is not relocated because [that] the data stored in that storage area did not originate with drive D4.

The management entity may also instruct the RAID controller to regenerate the data from the failure domain 194 using data from corresponding stripe units on the other drives D1 60, D2 70, D3 80. In some instances, data in a RAID stripe unit may be regenerated by using an exclusive-OR (XOR) operation on data from the other stripe units within the same RAID stripe. Once the data from the failure domain 194 has been regenerated, the data is stored in the storage area 204 of the hot spare drive 100.

Still further, the management entity may instruct the RAID controller to transfer any other data stored on the drive D4 90 to the hot spare drive 100, preferably in a destination storage location on the host spare drive corresponding to the originating storage location on the drive D4. After all the data from the drive D4 has been evacuated to the hot spare drive, the drive D4 may be shut down. Drive D4 is preferably then replaced so that the array of drives 52 will again have a hot spare drive.

Without regard to the specific example of FIG. 10, the management entity may determine whether to activate a hot spare drive or utilize a virtual hot spare area on the original drives of the RAID array based on various considerations:

(1) Whether there is sufficient capacity in the RAID array to host the relocated data without risk of a single point of failure while allowing enough physical volume capacity to provide direct service actions. A "single point of failure" is any non-redundant part of a system that will stop an entire system from working if the part were to fail.

(2) Whether there is enough unused storage space on the drive with the failed component to satisfy the entire need of a dynamic pseudo-virtual storage regeneration relocation target (i.e., to store the relocated data) and still meet expected or approved system demands for data storage capacity. If there is enough space on the disk with a failed component to rewrite the entire contents of the failure domain of the failed component, thus creating no change in the spindle failure domain. In such a case, the management entity may not decide to activate the hot spare drive.

(3) Whether the amount of unused storage space in the RAID array would be sufficient to accommodate another likely failure (i.e., perhaps a second head failure) after repopulating the dynamic pseudo-virtual storage regeneration target. In one example, if the RAID system is designed or configured to have a hot spare drive in order to meet certain data availability objectives of an end user, then any service action performed on the RAID system will preferably leave the RAID system with a hot spare drive or similar recovery capability.

(4) Whether there is enough storage space remaining in the RAID array to accommodate the user's expected use of the RAID system without undue constraints.

(5) Determine whether the hot spare drive should become the host of the entire contents of a failed disk or just be use as a semi-permanent part of the array.

Furthermore, embodiments may determine whether to delay a service action based on a level of risk of data loss. Embodiments may beneficially avoid or delay service actions on the RAID system if such delay is determined to be unlikely to compromise data reliability. The management entity may perform one or more of the operations:

(1) Calculate the available storage space across all failure domains as well as pairs of domains.

(2) Predict the user's capacity demands over time based on historical capacity and interpret a combination of the data growth and identifying the historical capacity range banding. Based on the predicted capacity demand, the management entity may estimate a time when a service action may be prompted by user capacity growth consuming the storage capacity of the RAID system or a user's allocated storage capacity. For example, the time of a service action may be set when the user's capacity growth is within some minimum number of days of reaching a predetermined capacity limit, which may be expressed as either a percentage or an absolute number.

(3) Calculate an impact for each failure domain. In our example, the management entity could easily calculate the impact of a single head failure as 20 TB/10 heads=1 TB per head, or of a platter (or two head failure) of 2 TB per platter. Note that recovery from a total drive failure will most likely require use of the hot spare drive.

(4) Determine disk usage of the new array (i.e., the RAID array after the failure). The management entity may identify, in advance of a component failure (and, if possible, in the event of failure assign), the target location and protection mechanism (i.e., RAID level) for potential relocation of data on the remaining other drive (be it moved or rebuilt).

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-transitory computer readable medium and program instructions embodied therein, the program instructions being configured to be executable by a processor to cause the processor to perform operations comprising:
identifying, via communication with a RAID controller that manages operation of an array of drives as a RAID storage system, one of the drives that has been compromised and a failed component of the identified drive that compromised the identified drive;
identifying a failure domain associated with the failed component, wherein data stored within the failure domain associated with the failed component has become inaccessible;
instructing, in response to the failed component having a failure domain that satisfies a first condition, the RAID controller to perform a first recovery action that includes regenerating the inaccessible data using data from other drives within the array of drives and storing the regenerated data on available storage of the identified drive outside the failure domain associated with the failed component;
identifying a storage location on the identified drive that has a sufficient amount of available storage capacity to store the regenerated data, wherein instructing the RAID controller to perform the first recovery action includes instructing the RAID controller to store the regenerated data at the identified storage location;
maintaining a log of recovery actions performed on the array of drives;
updating the log of recovery actions to include a log entry for the first recovery action identifying the storage location of the failure domain associated with the failed component and the identified storage location; and
causing, in response to detecting that the identified drive has experienced a complete failure, the RAID controller to regenerate the data that was stored on the identified drive using data from other drives within the array of drives and move, according to a reverse of the log entry for the first recovery action, the data that was stored in the identified storage location to a storage location on a replacement drive or hot spare drive that corresponds with the storage location of the failure domain associated with the failed component.

2. The computer program product of claim 1, wherein the first condition is that the failure domain is less than an available storage capacity of the identified drive or less than a difference of the available storage capacity of the identified drive less a predetermined storage capacity margin.

3. The computer program product of claim 1, wherein the RAID controller supports virtual assignment of RAID stripes by maintaining a data structure that maps, for each of a plurality of RAID stripes, a specific storage location for each stripe unit included in the RAID stripe, the operations further comprising:
causing the RAID controller to update the data structure to indicate that one or more stripe units previously stored in the failure domain associated with the failed component are now stored in the identified storage location.

4. The computer program product of claim 1, further comprising:
maintaining a log of recovery actions performed on the array of drives;
updating the log of recovery actions to include an entry for the first recovery action identifying the storage location of the failure domain associated with the failed component and the identified storage location; and
causing, in response to detecting that the identified drive is being evacuated to a hot spare drive, the RAID controller to transfer the data stored in the identified storage location of the identified drive to a storage location on the hot spare drive that corresponds with the storage location of the failure domain on the identified drive.

5. The computer program product of claim 1, the operations further comprising:
instructing, in response to the failed component having a failure domain that satisfies a second condition, the RAID controller to perform a second recovery action including activating a hot spare drive managed by the RAID controller, regenerating the inaccessible data using data from other drives within the array of drives, storing the regenerated data on the activated hot spare drive, and transferring all data outside the failure domain associated with the failed component from the identified drive to the activated hot spare drive.

6. The computer program product of claim 5, wherein the second condition is that the failure domain is greater than the available storage capacity of the identified drive or greater than a difference of the available storage capacity of the identified drive less a predetermined storage capacity margin.

7. The computer program product of claim 5, wherein the second condition is that the failure domain is greater than the available storage capacity of the array of drives or greater than a difference of the available storage capacity of the array of drives less a predetermined storage capacity margin.

8. The computer program product of claim 1, the operations further comprising:
instructing, in response to the failed component having a failure domain that satisfies a second condition, the RAID controller to perform a second recovery action that includes regenerating the inaccessible data using data from other drives within the array of drives and storing the regenerated data in a new stripe across a plurality of the array of drives.

9. The computer program product of claim 8, wherein the second condition is that the failure domain is greater than the available storage capacity of the identified drive or greater than a difference of the available storage capacity of the identified drive less a predetermined storage capacity margin.

10. The computer program product of claim 8, wherein the new stripe is a RAID configuration protecting data against at least as many drive failures as a RAID configuration associated with the data stored in the failure domain of the failed component.

11. The computer program product of claim 1, wherein identifying the failure domain associated with the failed component includes accessing stored information that, for each of a plurality of components of the identified drive, identifies a failure domain associated with the identified component and an amount of storage capacity associated with the failure domain.

12. The computer program product of claim 11, wherein the array of drives are hard disk drives, wherein each hard disk drive includes multiple heads, multiple platters and multiple actuators, and wherein the failed component of the identified hard disk drive is one of the heads, one of the platters or one of the actuators.

13. The computer program product of claim 1, further comprising:
  determining whether the RAID storage system includes a hot spare drive and/or an open slot for adding another drive; and
  delaying, in response to determining that the RAID storage system includes a hot spare drive and/or an open slot for adding another drive, a service action to replace the identified drive or a recovery action to evacuate data from the identified drive to the hot spare drive until the available storage capacity on the identified drive is less than a predetermined amount of available storage capacity.

14. The computer program product of claim 1, the operations further comprising:
  determining, after performed the first recovery action, a minimum number of points of component failure in the array of drives that would result in loss of data; and
  delaying a service action for the identified drive until the minimum number of points of component failure is less than a predetermined number of points of failure.

15. The computer program product of claim 1, the operations further comprising:
  calculating a currently available amount of storage capacity across the array of drives;
  predicting an available amount of storage capacity across the array of drives over time based on the currently available amount of storage capacity on the array of drives and a historical average of data storage growth rate for the array of drives;
  estimating a date when the predicted available storage capacity will be within a predetermined period of time or within a predetermined amount of storage capacity from reaching a predetermined storage capacity limit of the RAID storage system; and
  scheduling a service action on the identified drive for the estimated time.

16. The computer program product of claim 1, the operations further comprising:
  replacing the identified drive in response to a demand for storage capacity in the array of drives exceeding the amount of available storage capacity in the array of drives.

17. The computer program product of claim 1, the operations further comprising:
  receiving user input or user settings indicating whether a predetermined amount of storage capacity and/or reliability is to be strictly enforced; and
  immediately initiating a recovery action to activate and use the hot spare drive and/or a service action to replace the identified drive in response to the user input or user settings indicating that the predetermined amount of storage capacity and/or reliability is to be strictly enforced.

18. A computer program product comprising a non-transitory computer readable medium and program instructions embodied therein, the program instructions being configured to be executable by a processor to cause the processor to perform operations comprising:
  identifying, via communication with a RAID controller that manages the operation of an array of drives as a RAID storage system, one of the drives that has been compromised and a failed component of the identified drive that compromised the identified drive;
  identifying a failure domain associated with the failed component, wherein data stored within the failure domain associated with the failed component has become inaccessible;
  instructing the RAID controller to regenerate the inaccessible data using data from other drives within the array of drives and store the regenerated data on a separate RAID stripe stored across a plurality of the drives in the array of drives;
  maintaining a log of recovery actions performed on the array of drives;
  updating the log of recovery actions to include a log entry identifying the storage location of the failure domain associated with the failed component and the storage location of the separate RAID stripe stored across a plurality of the drives in the array of drives; and
  causing, in response to detecting that the identified drive has experienced a complete failure, the RAID controller to regenerate the data that was stored on the identified drive using data from other drives within the array of drives and move, according to a reverse of the log entry, the data that was stored in the separate RAID stripe to a storage location on a replacement drive or hot spare drive that corresponds with the storage location of the failure domain associated with the failed component.

* * * * *